US005275460A

United States Patent [19]
Kraus

[11] Patent Number: 5,275,460
[45] Date of Patent: Jan. 4, 1994

[54] MOTOR VEHICLE PROTECTIVE COVER

[76] Inventor: Menahem Kraus, 25 Pashosh St., Rehovot, Israel, 76111

[21] Appl. No.: 890,858

[22] Filed: Jun. 1, 1992

Related U.S. Application Data

[63] Continuation-in-part of Ser. No. 747,133, Aug. 19, 1991, abandoned.

[51] Int. Cl.$^5$ ............................................. B60J 11/00
[52] U.S. Cl. ..................... 296/136; 296/95.1; 160/370.2; 160/DIG. 16; 150/166; 52/3
[58] Field of Search ..................... 160/84.1, DIG. 16; 296/95.1, 98, 136; 150/166, 168; 52/2.22, 2.23, 3, 5

[56] References Cited

U.S. PATENT DOCUMENTS 2,751,977  6/1956  Pinkerton ........................... 296/95.1

FOREIGN PATENT DOCUMENTS

| | | | |
|---|---|---|---|
| 2064694 | 7/1972 | Fed. Rep. of Germany | 296/136 |
| 2641411 | 3/1978 | Fed. Rep. of Germany | 296/136 |
| 56-8729 | 2/1981 | Japan | 150/166 |
| 0102621 | 6/1984 | Japan | 296/136 |

Primary Examiner—Dennis H. Pedder
Attorney, Agent, or Firm—Krass & Young

[57] ABSTRACT

A protective cover for a vehicle formed of a sheet of protective material having a plurality of magnetic portions distributed at intervals throughout the sheet to secure the cover to the vehicle. The sheet is pleated or otherwise adapted to be disposed in a closed storage configuration. Adjacent magnets correspond spatially to one another so as to be magnetically attracted to one another when the sheet is folded or otherwise disposed in its storage configuration. Adjacent pairs of magnets are further separated from subsequent pairs of magnets to minimize overlap of the magnets and corresponding width of the folded sheet.

Preferably, the sheet is formed of a plastic material, such as a nonwettable polyethylene material. Further, to adequately protect the vehicle from sunlight, the sheet should have an optical opacity of at least 80%.

The invention is attached to a vehicle by initially attaching a portion of the cover to a portion of the vehicle using at least one of the plurality of magnets. Further portions are secured to the vehicle as the cover is placed over the vehicle. Thus, the sheet-like protective cover is initially provided in a closed storage configuration and further portions of the vehicle are covered as the cover is opened.

4 Claims, 3 Drawing Sheets

MOTOR VEHICLE PROTECTIVE COVER

REFERENCE TO RELATED APPLICATION

This application is a continuation-in-part of pending application Ser. No. 747,133, filed Aug. 19, 1991, now abandoned.

FIELD OF THE INVENTION

The present invention relates to protective covers for motor vehicles.

BACKGROUND OF THE INVENTION

Motor vehicles are typically stored in garages to protect them from damage while not in use. In many situations, however, such an enclosure is unavailable and the motor vehicles must be left unattended where they are subjected to wide varieties of environmental extremes. For example, an automobile which is parked outside for several days may be subjected to moisture from rain, dew, snow or frost; UV radiation and high temperatures from sunlight; low temperatures from conditions at night; abrasion from wind carried particles; and other environmental factors. All of these elements may cause damage to the vehicle. It is known to provide a protective cover to shield the vehicle from the environment in such situations.

Automobile sun shades and covers are currently available in various shapes. Some of the protectors are mounted inside the car, and include rolled blinds fixed to windows and folded cardboard shades adapted to be positioned adjacent a window, such as those described in U.S. Pat. Nos. 4,202,396 and 4,838,335. These devices are inexpensive and convenient to use; however, they only cover a single window and leave the external and other heat absorbing surfaces unprotected.

Other types of protectors are externally applied so as to cover at least a portion of the surfaces exposed to the environment. Some covers are made of a flexible fabric-like material configured to fit snugly around the vehicle. U.S. Pat. No. 4,938,522 discloses a cover which is held in place by suitable means for biasing the open end about the lower portion of the vehicle. U.S. Pat. No. 4,972,892 describes a cover made of a flexible sheet material for the passenger cabin of a vehicle. Adjacent sections are fixed to each other by fasteners for support. Such covers are bulky and cumbersome to apply to and remove from the vehicle. Further, they are difficult to handle and are inconvenient to fold and store when not in use because of their undefined form.

The difficulty of manually handling a large and bulky piece of cover material has largely been ignored by the prior art. An external car cover is by nature large: at least 5 feet×10 feet. It is thus significantly larger than the human arm span of five to six feet and folding and unfolding the cover usually necessitates moving around the car a number of times. Further, experience and dexterity are usually needed to prevent the cover from slipping away during application and/or refolding.

One obvious solution that has been offered in the prior art is a motor operated mechanized device which permanently attached to the automobile. This, however, is unsightly and prohibitively expensive.

Other covers have been developed which are pleated to provide a guide for folding. For example, U.S. Pat. No. 4,889,171 describes a pleated cover which is positioned about the upper surfaces of the vehicle and attached to the car's underside. Although this design is adapted to be folded and compressed when not in use, it is still cumbersome and inconvenient to apply to and remove from the vehicle. U.S. Pat. No. 4,951,993 describes an accordion-shaped or pleated cover attached to the front and rear of the car. Again, the application of the cover to the car is a lengthy and cumbersome operation.

The present invention provides an automobile cover that is lightweight, light-reflective, inexpensive, and conveniently applied and removed. A number of patents have addressed these goals, however, none achieved all of them.

DESCRIPTION OF THE INVENTION

It has been found that a solution satisfying all the above criteria is provided by a cover sheet comprising matching panel sections that attaches to the car section-by-section while being unfolded or unrolled. The cover attaches to the car at the very beginning of the covering process, and becomes gradually more attached as the unrolling or unfolding proceeds. This eliminates the risk of the cover slipping away during the covering process and allows the whole process to be carried out from one side of the car.

More specifically, the cover of the present invention comprises a sheet of protective material of a dimension sufficient to cover the portion of the vehicle to be protected. The sheet of protective material is adapted to be disposed in either an open operative configuration or a closed storage configuration. The sheet has a degree of flexibility so as to be adapted to substantially conform to the portion of the vehicle to be protected when placed, e.g., on and in contact with the vehicle roof in the open operative configuration. A plurality of magnetic portions are secured at intervals distributed throughout the sheet so as to magnetically secure the sheet directly onto the vehicle as the sheet is positioned on the vehicle. Thus, the magnets allow the sheet to be attached to the vehicle in its closed configuration and to progressively attach to the vehicle as the cover is unrolled or unfolded into the open configuration thereon.

Preferably, the sheet can be unrolled or unfolded, as described hereinafter, along fold lines aligned substantially parallel to one another so as to form a plurality of adjacent panels or sheet sections therebetween to provide the degree of flexibility necessary to substantially conform to the vehicle surface. At least one magnetic portion of the plurality of magnetic portions is disposed in each of the sheet sections. This allows the sheet to be firmly and evenly secured to the vehicle by the plurality of magnets. However, adequate engagement between the sheet and the vehicle may still be maintained even though some sections do not include a magnetic portion therein.

Preferably, the plurality of magnets are disposed at intervals distributed throughout the sheet so that, when said cover is disposed in the closed configuration, at least one magnet pair of the plurality of magnet pairs can retain the cover in the closed configuration. More specifically, the magnetic portions located in pairs of adjacent sheet sections may be oriented so as to correspond to one another when the sheet is folded along the fold lines between adjacent sheet sections so as to be magnetically attracted to one another. This arrangement aids in maintaining the sheet in its closed configuration. Most preferably, the magnetic portions located in pairs of adjacent sheet sections are further oriented so that the magnetic portions in each pair of adjacent sheet sections are separated from the magnetic portions in subsequent pairs of adjacent sheet sections when the sheet is folded along the fold lines into the closed configuration to minimize overlap of the magnetic portions and corresponding width of the folded sheet.

The cover sheet of the present invention may further include one or more fold lines that are perpendicular to the previously described substantially parallel fold lines so as to form adjacent pluralities of sections defined by said fold lines. In this embodiment, at least one magnetic portion of the plurality of magnetic portions is disposed in each of the sheet sections of each of the pluralities of sections. Such additional fold lines allow for relatively large sheets to be packaged into a more compact storage configuration.

Preferably, the sheet is formed of a plastic material, such as a nonwettable polyethylene material. Further, to adequately protect the vehicle from sunlight, the sheet should have an optical opacity of at least 80%.

Substantially rigid handle elements are preferably secured to the end of the sheet so as to extend from one side thereof to allow the sheet to be conveniently opened from one side of the vehicle. At least one handle element is required to perform this function; however, a pair of handles disposed at opposite ends of the sheet (corresponding to the front and rear ends of the portion of the vehicle to be protected) are preferred. In a preferred embodiment, the sheet end (e.g., half of the sheet end approximating the size of a sheet section) is formed as a hollow pocket, and the handle element preferably is formed as a rigid paddle or the like which removably or non-removably fits into the pocket and serves to stiffen the endmost sheet sections so that in the open configuration rolling or folding up of the cover sheet section by section along parallel fold lines is facilitated. In this embodiment, as a final step in folding, opposite halves of the sheet may be folded onto the corresponding handle elements to produce a compact closed storage configuration, following which the handle elements can advantageously be removed from their respective handle pockets. Unrolling the sheet, also, is thereby facilitated, since the portion of sheet rolled onto either handle element is not unduly large or cumbersome.

The present invention may be attached to the vehicle by initially attaching a portion of the cover to a portion of the vehicle using at least one of the plurality of magnets. Further portions of the cover are secured to further portions of the vehicle as the cover is unrolled for placement on top of the vehicle. Thus, the sheet-like protective cover may be initially disposed in a closed storage configuration and portions of the vehicle may be sequentially covered as the cover is opened into an open operative configuration.

BRIEF DESCRIPTION OF THE DRAWINGS

These and other objects and aspects of the invention will become apparent in the detailed description of the invention hereinafter with respect to the drawings in which.

DETAILED DESCRIPTION OF THE PREFERRED EMBODIMENT

Figure 1:
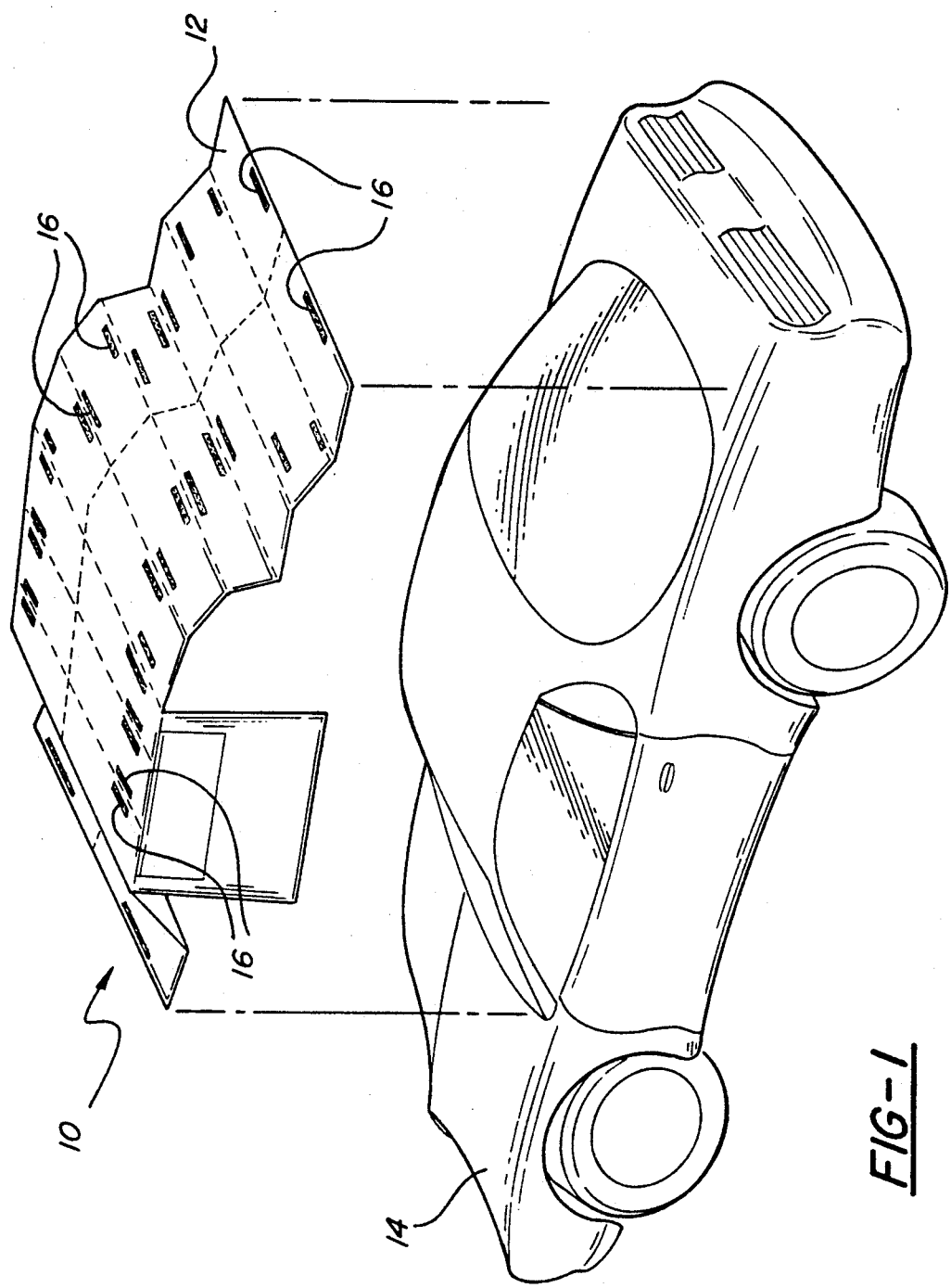
FIG. 1 is an exploded perspective view of the protective cover of the present invention on a vehicle.

With reference to FIG. 1, the cover 10 of the present invention comprises a sheet 12 of flexible protective material of a dimension sufficient to cover the portion of the vehicle 14 to be protected. A plurality of magnetic portions 16 are secured to the sheet 12 at intervals thereabout so as to magnetically secure the cover 10 to the vehicle 14 as the cover 10 is positioned over the vehicle. Thus, the magnets allow the cover 10 to automatically and sequentially attach to the vehicle 14 as the cover 10 is disposed thereon.

Figure 2:
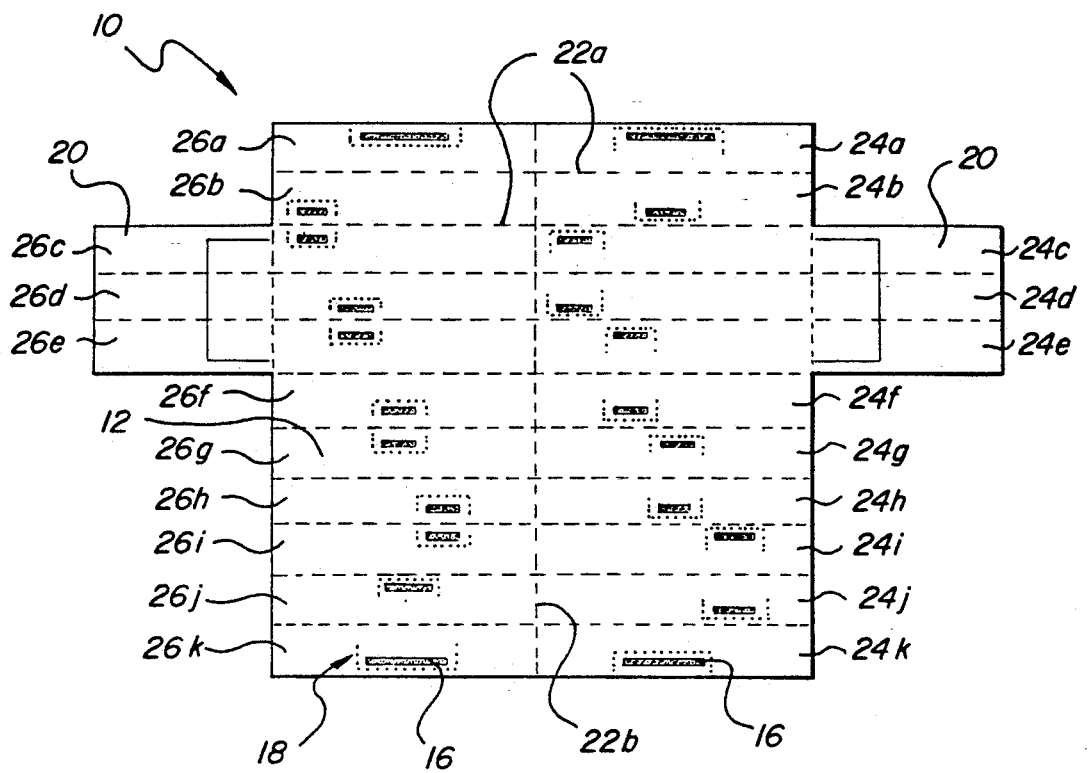
FIG. 2 is a top view of one embodiment of the protective cover of the present invention in an open configuration.
Figure 3:
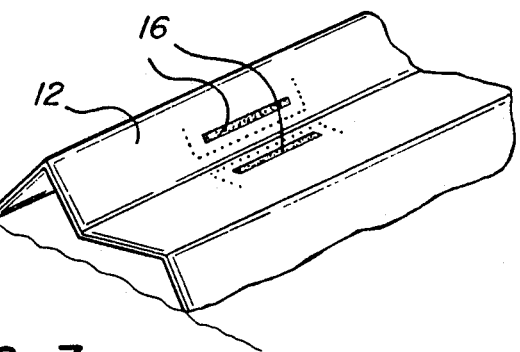
FIG. 3 is a detailed view of a pair of magnetic sections of the protective cover of the present invention.
Figure 4:
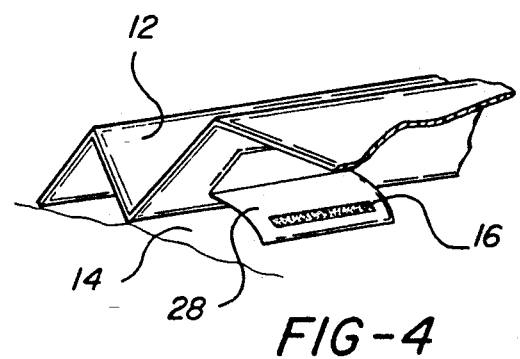
FIG. 4 is a detailed view of an alternate manner for securing a magnetic section onto the protective cover of the present invention.

More specifically and with reference also to FIGS. 2-4, the protective cover 10 of the preferred embodiment comprises a sheet 12 of flexible protective material. The sheet 12 is shaped so as to protect selected surfaces of the vehicle 14. Typically, the cover 10 would protect the upper surfaces of the vehicle 14 including the window areas thereof. The cover 10, therefore, preferably includes side flaps which are adapted to be inserted into the doors (i.e., the doors are closed thereon). These side flaps protect the side windows, shade the interior from sunlight, and secure the cover 10 to prevent or deter theft thereof.

The sheets 12 used in this invention can be made of a variety of materials having the appropriate combination of flexibility and rigidity, including plastic sheets, cardboard, heavy paper, certain fabrics, metal foil, etc. Preferred materials are plastic based, such as nontransparent plastic films, laminates (such as metal plastic laminates), and woven and nonwoven polymeric materials. Such materials have the required weather resistance, reflectivity, optical opacities of over 80%, heat insulating properties and strength to protect the vehicle from the environment. A preferred material is a spunbonded, high density polyethylene, sold under the trade name TYVEK by DuPont. This material has high tensile strength, optical opacity of 80-90%, is nonwettable, and has good chemical and UV resistance. The material is easy to cut, fold or roll into a final shape. Additionally, it is printable and can be glued to itself and other materials.

A plurality of magnetic portions 16 are secured to the sheet 12 at intervals thereabout for use in magnetically securing the sheet 12 to the vehicle 14 when it is positioned thereover. As most vehicles are made of ferrous sheet metal, these magnets 16 allow the sheet 12 to automatically attach to the vehicle 14 as the cover 10 is disposed thereon. Commercially available flexible, soft magnets 16 used in conjunction with a sheet 12 enable the fitting of the cover 10 to various shapes and contours associated with different vehicles.

With reference specifically to FIGS. 2 and 3, the unfolded cover 10 consists of a large integral sheet body section 18 with side flaps 20 attached thereto by gluing, welding, sewing or other attachment methods. The sheet 12 is folded along the illustrated fold lines, including horizontal fold lines 22a and vertical fold lines 22b, so as to provide a series of adjacent sheet sections 24a-k, 26a-k. Magnets 16 are permanently attached to sheet 12 and are oriented such that they will cover the entire area of the sheet 12 to ensure good attachment to the vehicle's upward-facing surfaces. The magnets 16 can be secured between plys of a laminate sheet 12, glued, or otherwise fastened in place. The magnets 16 are further arranged in pairs such that their mutual attraction makes folding of the sheet 12 easier and ensures a neat, tightly folded cover 10 when not in use. The magnets on sections 24a and b, 24c and d, 24e and f, etc. on the right side folds will pair. Similarly, magnets on folds 26b and c, 26d and e, etc. will pair during the folding process. Thus, the plurality of magnets 16 are grouped into pairs disposed at intervals about the sheet so that, when the cover is disposed in its closed storage configuration, each of the pairs of magnets 16 operate to retain the cover in the closed storage configuration.

Most preferably, the magnetic portions 16 located in pairs of adjacent sheet sections 24,26 are further oriented so that the magnetic portions 16 in each pair of adjacent sheet sections (such as 24a and b) are separated from the magnetic portions 16 in subsequent pairs of adjacent sheet sections (such as 24c and d) when the sheet is folded along the fold lines 22 to minimize overlap of the magnetic portions 16 and corresponding width of the folded sheet 12.

With reference also to FIG. 4, an additional feature that can be added to a cover 10 are magnet cut-out flaps 28. The magnets 16 are secured to these small flaps 28 which extend from the bottom surface of the cover 10. The flaps 28 will fold out when the cover 10 is applied to the vehicle, as shown in FIG. 4, to facilitate contact between each magnet 16 and the metal surface of the vehicle 14.

The cover 10 is applied to the vehicle 14 by laying the still rolled-up cover on the roof 34 such that one section attaches to the vehicle by its built-in magnet 16. The cover is then progressively unrolled or otherwise opened to cover increasing areas of the roof and windows so that consecutive sections cling to the vehicle by the magnets 16 as the magnets are exposed. Eventually the whole passenger compartment or whole vehicle is covered. Rolling up is a reversal of this procedure. The side flaps are first folded up onto the body of the cover and then magnetically attached segments are rolled or folded up while the rest of the cover remains attached to the vehicle. This prevents the handling of large, heavy, unattached sections of the cover material. For this reason also the cover will not slip away during uncovering or covering.

Figure 5:
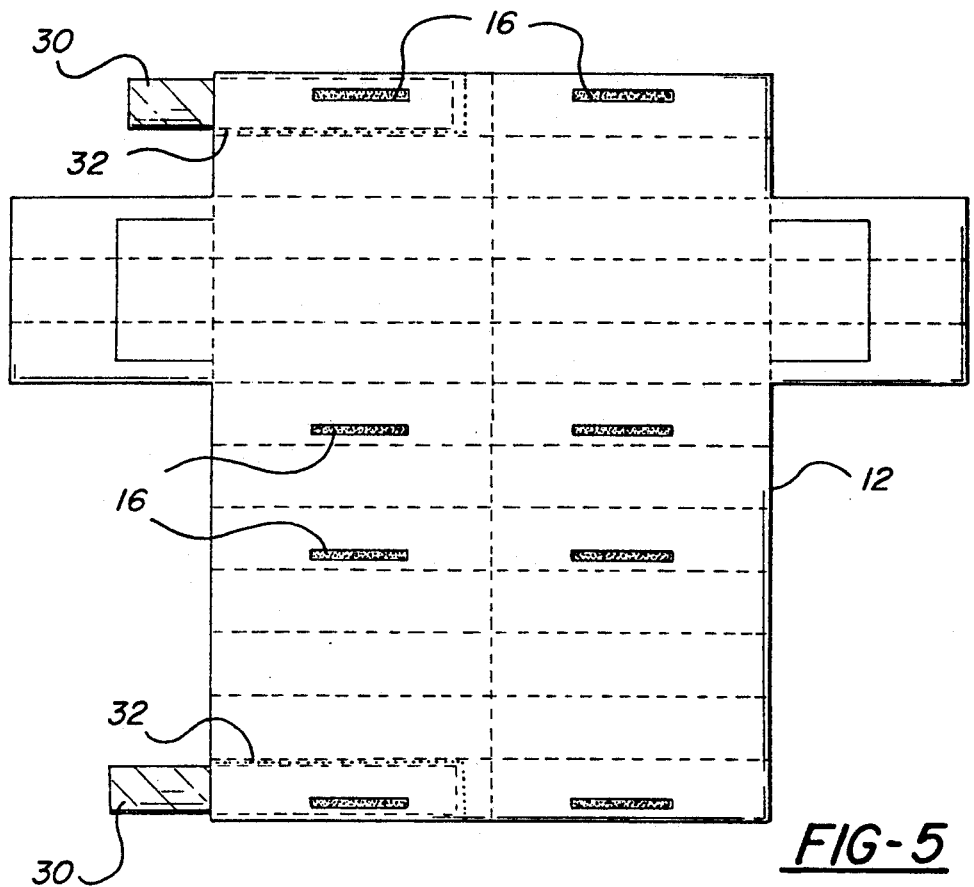
FIG. 5 is a top view of an alternate embodiment of the protective cover of the present invention and its handle elements in an open configuration.
Figure 6:
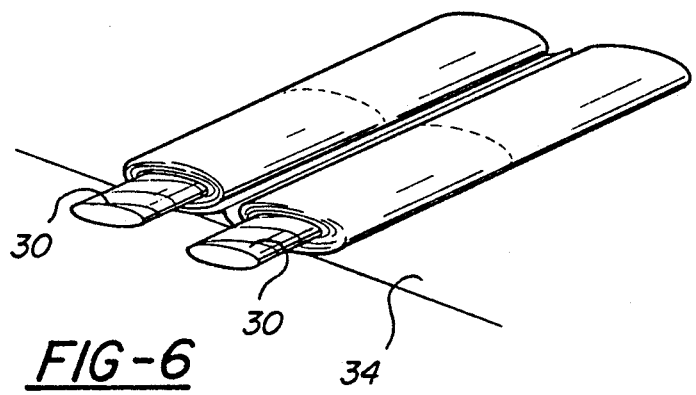
FIG. 6 is a perspective view of the alternate embodiment of the protective cover of the present invention in an intermediate configuration.
Figure 7:
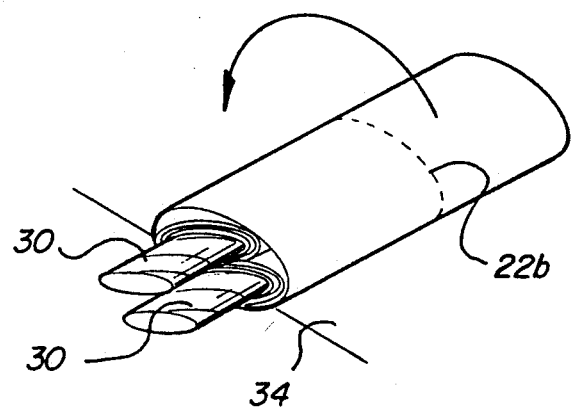
FIG. 7 is a perspective view of the alternate embodiment of the protective cover of the present invention in a closed configuration.

The most preferred embodiment is schematically shown in FIGS. 5-7. This embodiment is constructed similarly to the previously described embodiment with two notable exceptions. First, substantially rigid handle elements or paddles 30 are secured in pockets 32 disposed at the opposite ends of the sheet 12. These handle elements 30 secured for example in the respective end pockets 32 assist in the rolling up/folding and unrolling-/unfolding process by providing a measure of rigidity to the sheet thereat. Second, fewer magnetic portions 16 are utilized; however these magnetic portions 16 are generally larger than those previously depicted.

Dismounting this embodiment again includes the initial step of folding in the side flaps. The cover 10 is then rolled or folded up along the horizontal lines from both ends inwardly. Once the entire sheet 12 has been so rolled up or folded, the cover 10 is configured as a pair of rolls positioned side by side and disposed generally on the center of the vehicle roof, as shown in FIG. 6. One of these parts may be folded over the other part (FIG. 7), and the whole roll folded in half along a vertical line 22b into a compact storage package, as shown in FIG. 7.

In covering the vehicle the above steps are reversed: the cover is placed on the center of the roof in its storage configuration, and unrolled along the vertical fold line and then the horizontal fold lines. Rigid handle elements 30 attached to the end sections, preferably removably attached in pockets 32 (FIG. 5) facilitate this rolling and unrolling. The fewer, larger magnetic portions 16 adequately secure the cover 10 to the vehicle 14. Further, since the handle element approximates the shape and size of the sheet sections, each individual section is not as susceptible to mishandling during the covering and uncovering processes, and each adjacent section need not be magnetically secured to the preceding section for storage purposes.

In summary, the present invention may be attached to the vehicle by initially attaching a portion of the cover to a portion of the vehicle using at least one of the plurality of magnets. This initially attached portion may be an end of the sheet or a central portion as disclosed herein above with reference to FIGS. 5-7. Further portions of the cover are secured to further portions of the vehicle as the cover is unfolded and placed on the vehicle. Thus, the sheet-like protective cover, whether pleated, rolled, or otherwise stored, may be provided in a closed storage configuration and further portions of the vehicle are covered as the cover is opened into an open operative configuration.

Experience has shown that the previously described covering and uncovering methods are very quick and convenient; however, other folding modes are possible. Likewise, the covers of this invention can come in a number of shapes including sheets rolled or folded on parallel fold lines. The magnets used in this invention can be rigid or flexible, built into the cover material or attached to it mechanically such as by glue or other fastening means. The magnets are useful, not only to attach the cover to the car, but also to keep the cover folded and neat when not in use. The cover can be folded in various shapes such as a continuous roll, pleated accordion sections, folded in square folds, or otherwise stored.

From the foregoing description of the preferred embodiment it can be seen that various alternative embodiments of the invention can be anticipated without departure from the scope of the invention as defined in the following claims.

I now claim:

1. A protective cover for a motor vehicle, said cover comprising:
   a sheet of protective material having opposite sides and ends, said sheet being divided into a plurality of sections by a plurality of horizontal fold lines and by a vertical fold line;
   said sheet being configured to be folded from a closed, storage configuration wherein at least some of said sections are in a stacked relationship, to an open, operative configuration where none of said sections are in a stacked relationship;

a plurality of magnets disposed on said sheet, at least two of said magnets being disposed so that when the sheet is in said storage configuration, said at least two magnets cooperate to retain said sheet in said storage configuration; and a first rigid handle having a portion overlapping a first end of said sheet and a second rigid handle having a portion overlapping a second end of said sheet opposite said first end, the overlapping portion of each of the handles being substantially equal in width to a width of one of said sections.

2. The cover of claim 1, wherein said plurality of magnets are further operative to retain said cover in the open, operative condition on said vehicle.

3. A protective cover for a motor vehicle, said cover comprising:

a sheet of protective material having opposite sides and ends, said sheet being divided into a plurality of sections by a plurality of horizontal fold lines and by a vertical fold line; said sheet being configured to be folded from a closed, storage configuration wherein at least some of said sections are in a stacked relationship, to an open, operative configuration wherein none of said sections are in a stacked relationship and wherein said sheet is configured to substantially conform to and cover at least a passenger compartment of a vehicle when disposed in the open, operative configuration; and a first and a second rigid handle, each having an overlapping portion substantially equal in width to a width of a given one of said sections, said first handle being located at a first end of said sheet and the second handle being disposed at a second end of said sheet, said handles being further disposed and configured so that a portion of each of said handles extends from a side of the sheet, so that said cover may be folded by grasping said handles, moving said handles so as to first fold said sheet along said horizontal folds and subsequently fold said sheet along said vertical fold.

4. The cover of claim 3, wherein said handles are generally planar members and wherein said sheet includes a first and a second pocket, each pocket corresponding in size and shape to one of said sections, and configured to receive a handle therein.

* * * * *

UNITED STATES PATENT AND TRADEMARK OFFICE
CERTIFICATE OF CORRECTION

PATENT NO. : 5,275,460

DATED     : January 4, 1994

INVENTOR(S) : Kraus

It is certified that error appears in the above-identified patent and that said Letters Patent is hereby corrected as shown below:

Column 5, line 16, delete "etc. will" and insert --etc. on the left side folds will--.

Signed and Sealed this

Twenty-first Day of June, 1994

Attest:

BRUCE LEHMAN

Attesting Officer

Commissioner of Patents and Trademarks